(12) United States Patent
Kondo et al.

(10) Patent No.: US 10,180,546 B2
(45) Date of Patent: Jan. 15, 2019

(54) OPTICAL RECEPTACLE AND OPTICAL TRANSCEIVER

(71) Applicant: TOTO LTD., Kitakyushu-shi, Fukuoka (JP)

(72) Inventors: Sho Kondo, Fukuoka (JP); Hirotsugu Agatsuma, Fukuoka (JP); Satoshi Hakozaki, Fukuoka (JP); Satoshi Kaneyuki, Fukuoka (JP); Kohei Tominaga, Fukuoka (JP); Hiroki Sato, Fukuoka (JP)

(73) Assignee: Toto LTD., Fukuoka (JP)

( * ) Notice: Subject to any disclaimer, the term of this patent is extended or adjusted under 35 U.S.C. 154(b) by 0 days.

(21) Appl. No.: 15/632,973

(22) Filed: Jun. 26, 2017

(65) Prior Publication Data

US 2017/0293072 A1    Oct. 12, 2017

Related U.S. Application Data

(63) Continuation of application No. PCT/JP2015/086113, filed on Dec. 24, 2015.

(30) Foreign Application Priority Data

Dec. 26, 2014  (JP) .................. 2014-265175
Aug. 6, 2015   (JP) .................. 2015-156333
Dec. 22, 2015  (JP) .................. 2015-250459

(51) Int. Cl.
*G02B 6/38*   (2006.01)
*G02B 6/42*   (2006.01)
*G02B 6/02*   (2006.01)

(52) U.S. Cl.
CPC ......... *G02B 6/421* (2013.01); *G02B 6/02004* (2013.01); *G02B 6/38* (2013.01);
(Continued)

(58) Field of Classification Search
None
See application file for complete search history.

(56) References Cited

U.S. PATENT DOCUMENTS 5,278,929 A *  1/1994  Tanisawa ............. G02B 6/2804
                                                     385/43
6,301,411 B1 * 10/2001  Yuuki .................... G02B 6/421
                                                    385/146
(Continued)

FOREIGN PATENT DOCUMENTS

JP    S63-167310 A    7/1988
JP    H01-295208 A   11/1989
(Continued)

OTHER PUBLICATIONS

English translation of written opinion for PCT/JP2015/086113, dated Feb. 9, 2016.*

*Primary Examiner* — Michael Stahl
(74) *Attorney, Agent, or Firm* — Carrier Blackman & Associates, P.C.; Joseph P. Carrier; William D. Blackman

(57) ABSTRACT

An optical receptacle includes: a fiber stub including an optical fiber, a ferrule, and an elastic member; and a holder holding the fiber stub, the optical fiber including a cladding and a core for conducting light, the ferrule having a through-hole fixing the optical fiber, the elastic member fixing the optical fiber in the through-hole, the fiber stub having one end surface on the ferrule side, and another on an opposite side, the optical fiber including first and third portions on the opposite end surface sides and a second portion therebetween, a core diameter of the first portion being smaller than the third portion, and a core diameter of the second portion increasing from the first portion side toward the third portion side.

25 Claims, 10 Drawing Sheets

(52) U.S. Cl.
 CPC ............. *G02B 6/3846* (2013.01); *G02B 6/42* (2013.01); *G02B 6/02033* (2013.01)

(56) References Cited

U.S. PATENT DOCUMENTS

| | | | |
|---|---|---|---|
| 6,345,138 B1 * | 2/2002 | Kawai | G02B 6/26 385/43 |
| 2002/0039472 A1 | 4/2002 | Takeuti et al. | |
| 2003/0180016 A1 | 9/2003 | Yamada et al. | |
| 2007/0196053 A1 * | 8/2007 | Kewitsch | G02B 6/3825 385/74 |
| 2016/0131850 A1 * | 5/2016 | Kondo | G02B 6/421 385/80 |

FOREIGN PATENT DOCUMENTS

| | | | |
|---|---|---|---|
| JP | H06-174947 A | | 6/1994 |
| JP | H06-180406 A | | 6/1994 |
| JP | H08-201642 A | | 8/1996 |
| JP | H11-316319 A | | 11/1999 |
| JP | 2002-040294 A | | 2/2002 |
| JP | 2003-255182 A | | 9/2003 |
| JP | 2004-294906 A | * | 10/2004 |
| JP | 2005-017540 A | | 1/2005 |
| JP | 2005-037570 A | | 2/2005 |
| JP | 2005-208113 A | | 8/2005 |
| JP | 2005-275328 A | | 10/2005 |
| JP | 2008-015183 A | | 1/2006 |
| JP | 2006-030366 A | | 2/2006 |
| JP | 2006-119633 A | | 5/2006 |
| JP | 2006-235245 A | | 9/2006 |
| JP | 2007-148091 A | * | 6/2007 |
| JP | 2007-226118 A | | 9/2007 |
| JP | 2007-226120 A | | 9/2007 |
| JP | 2008-032993 A | | 2/2008 |

\* cited by examiner

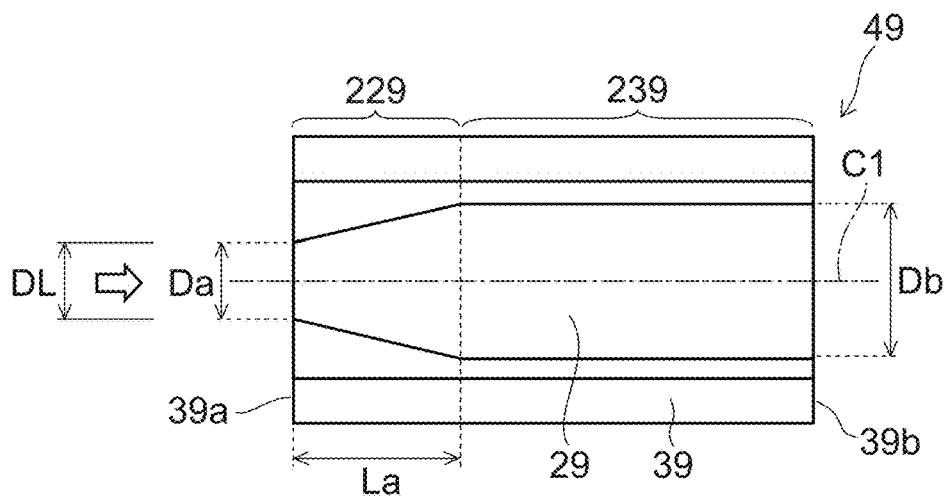
FIG. 12A
| LENGTH OF CONVERSION PORTION LOST BY POLISHING (%) | LOSS (dB) |
|---|---|
| 0 | −1.06 |
| 20 | −1.11 |
| 40 | −1.89 |
| 60 | −3.93 |
| 80 | −4.45 |
FIG. 12B
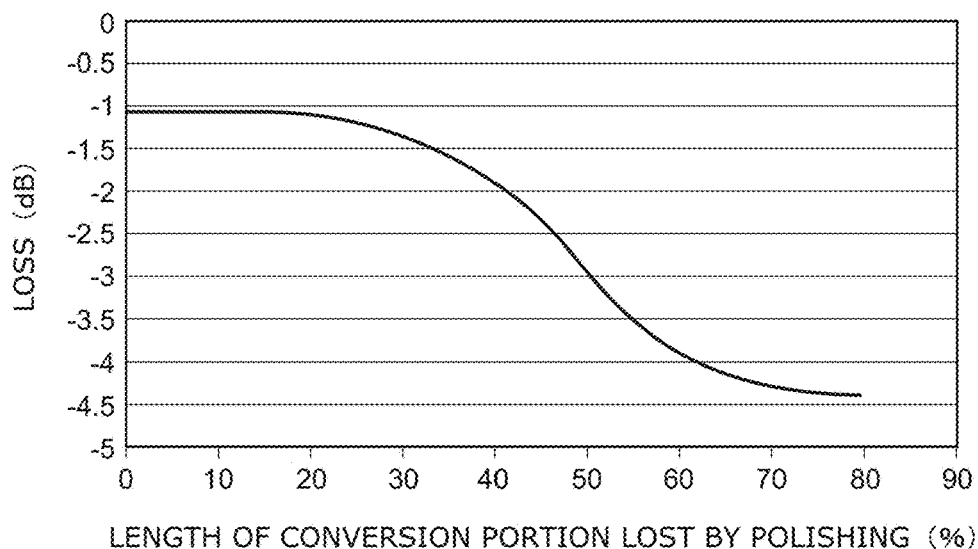
FIG. 12C

OPTICAL RECEPTACLE AND OPTICAL TRANSCEIVER

CROSS-REFERENCE TO RELATED APPLICATIONS

This is a continuation application of International Application PCT/JP2015/086113, filed on Dec. 24, 2015, which claims priority to Japanese Application No. 2014-265175, filed on Dec. 26, 2014, Japanese Application No. 2015-156333, filed on Aug. 6, 2015, and Japanese Application No. 2015-250459, filed on Dec. 22, 2015; the entire contents of each are incorporated herein by reference.

FIELD

Embodiments described herein relate generally to an optical transceiver module for optical communication and relate particularly to an optical receptacle favorable for a high-speed communication module.

BACKGROUND

An optical receptacle is used as a component for optically connecting an optical fiber connector to an optical element such as a light receiving element, a light emitting element, etc., in an optical module of an optical communication transceiver.

In recent years, it is necessary to increase the speed of optical communication transceivers as IP traffic increases. Generally, the configurations of the transceiver and the like that employ the receptacle-type optical module are standardized; and it is necessary to downsize the optical module because the space necessary for the electronic circuit increases as the modulation rate of the optical signal emitted from a semiconductor laser which is one optical element is increased.

The mode field diameter of the semiconductor laser element is smaller than a core diameter of 10 µm of the optical fiber generally used as the transmission line of the optical signal.

In recent years, optical modules also are being used to increase the communication speed of optical transceivers, where the optical module has a structure in which multiple semiconductor lasers are included inside a single module; the light that is emitted from each of the semiconductor lasers is multiplexed in one waveguide inside the optical waveguide formed in the interior of a plate-like member; and subsequently, optical coupling is made to the optical fiber of the optical receptacle. To downsize these optical modules, it is necessary to downsize the plate-like member having the optical waveguide described above; and there is a trend of the core diameter of the optical waveguide becoming smaller.

In an optical module in which a light receiving element is used instead of the light emitting element as well, there is a trend of reducing the light-receiving diameter of the light receiving element for use in higher-speed longer-distance communication applications.

In the case where there is a difference between the fiber core diameter and the mode field diameter of the optical element, while it is necessary for the lens to have a magnification function to condense the light emitted from the semiconductor laser elements into the fiber core or condense the light emitted from the fiber core into the light receiving element, there is a problem that the larger the difference, the longer the focal length of the lens or the larger the number of necessary lenses, which makes the optical system complicated and expensive.

A method is known that in order to increase the total length of the module or to prevent complication of the optical system, the magnification by the lens is kept small, and instead a lens is formed at the tip of a part of the end face of the optical fiber on the optical element side, or the GI fiber is fused, thereby enlarging the mode field diameter of the incident light and making the optimum mode field diameter for the fiber incident on the fiber end face (for example, JP 2006-154243 A (Kokai)).

However, since the method of JP 2006-154243 A (Kokai) uses a GI fiber whose mode field diameter periodically changes, in order to obtain an optimum mode field diameter, it is necessary to strictly control the length of the GI fiber, and thus there is a problem that it is difficult to manage manufacturing.

When fibers having gradually different refractive indexes are fusion spliced from the core center to the outer circumference like the GI fiber, in the fusion splicing technique in which the fiber end faces are melted and integrated, the cores with different refractive indices are melted and blended. Therefore, it is difficult to manage the refractive index around the fusion bonded portion and there is a problem that the optical loss increases.

SUMMARY

According to an aspect of the invention, an optical receptacle is provided. The receptacle including: a fiber stub including an optical fiber, a ferrule, and an elastic member; and a holder holding the fiber stub, the optical fiber including a cladding and a core for conducting light, the ferrule having a through-hole fixing the optical fiber, the elastic member fixing the optical fiber in the through-hole, the fiber stub having one end surface on a side of the ferrule optically connecting to a plug ferrule, and one other end surface on an opposite side to the one end surface, the optical fiber including a first portion on a side of the one other end surface, a third portion on a side of the one end surface, and a second portion between the first portion and the third portion, a core diameter of the first portion being smaller than a core diameter of the third portion, a core diameter of the second portion increasing from a side of the first portion toward a side of the third portion, and the elastic member being provided between the optical fiber and an inner wall of the through-hole.

BRIEF DESCRIPTION OF THE DRAWINGS

FIG. 12A to FIG. 12C are schematic views illustrating analysis of about a length of the first portion;

DETAILED DESCRIPTION

Figure 1:
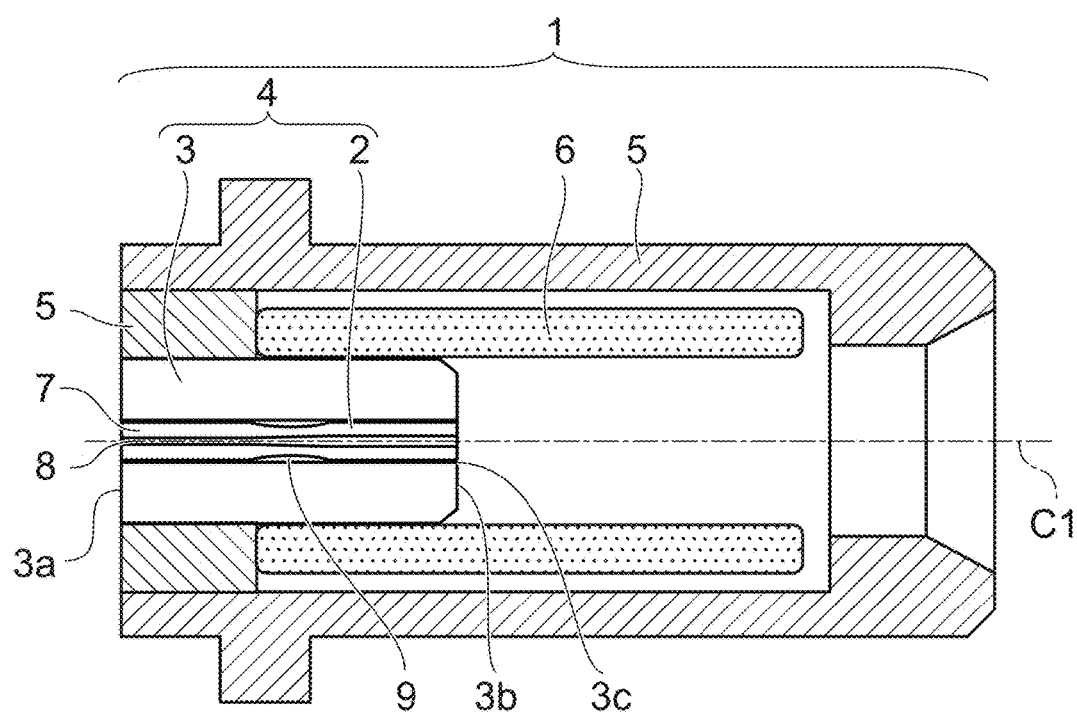
FIG. 1 is a schematic cross-sectional view of an optical receptacle showing a first embodiment of the invention.

An aspect of the invention is to provide an optical receptacle and an optical transceiver, wherein while contributing to making a total length of the optical module short by making a core of an optical element side end surface of the optical fiber small and fusing a fiber having a larger refractive index difference between the core and the cladding than the fiber generally used for the transmission line, a conversion coefficient of a mode field can be suppressed by forming a portion with gradually drifting refractive index and core diameter on the fused portion of the optical fiber used generally for the transmission line and the optical fiber having the larger refractive index difference between the core and the cladding, and as a result, reduction of a coupling coefficient from an optical element to a plug ferrule can be suppressed.

A first aspect of the invention is an optical receptacle including: a fiber stub including an optical fiber, a ferrule, and an elastic member; and a holder holding the fiber stub, the optical fiber including a cladding and a core for conducting light, the ferrule having a through-hole fixing the optical fiber, the elastic member fixing the optical fiber in the through-hole, the fiber stub having one end surface on a side of the ferrule optically connecting to a plug ferrule, and one other end surface on an opposite side to the one end surface, the optical fiber including a first portion on an side of the one other end surface, a third portion on a side of the one end surface, and a second portion between the first portion and the third portion, a core diameter of the first portion being smaller than a diameter of the third portion, a core diameter of the second portion increasing from a side of the first portion toward a side of the third portion, and the elastic member being provided between the optical fiber and an inner wall of the through-hole.

According to the optical receptacle, since the core diameter of the end surface on an opposite side to the side of the ferrule optically connecting to the plug ferrule is smaller than the core diameter of the end surface on the side of the ferrule optically connecting to the plug ferrule, a length of the optical module can be small.

When transiting from the first portion to the third portion, since the core shape can be suppressed from abruptly changing by forming the second portion, the optical loss in the second portion can be suppressed.

Since the first portion and the third portion do not change shapes with respect to an axis direction, and the optical loss is small, the second portion has no problem about the location in an inner diameter portion of the optical ferrule. Thereby, a precise control of the fiber length is not needed and the receptacle can be manufactured economically.

A second aspect of the invention is an optical receptacle according to the first aspect of the invention, wherein a refractive index of the core of the first portion, a refractive index of the core of the second portion, and a refractive index of the core of the third portion are equal one another, a refractive index of the cladding of the first portion is smaller than a refractive index of the cladding of the third portion, and a refractive index of the cladding of the second portion increases from the side of the first portion toward the side of the third portion.

According to the optical receptacle, the light can be confined without scattering even in a small core diameter by using the fiber having a large refractive index difference, and the loss of light incidence to the fiber can be suppressed. When transiting from the first portion to the third portion, since the refractive index difference can be suppressed from abruptly changing by forming the second portion, the optical loss in the second portion can be suppressed. Since a material of the core can be common, and the refractive index difference between the cores does not exist in a connection portion of the first portion, the second portion, and the third portion, the reflection loss at the connection portion can be suppressed.

A third aspect of the invention is an optical receptacle according to the first aspect of the invention, wherein a refractive index of the cladding of the first portion, a refractive index of the cladding of the second portion, and a refractive index of the cladding of the third portion are equal one another, a refractive index of the core of the first portion is larger than a refractive index of the core of the third portion, and a refractive index of the core of the second portion decreases from the side of the first portion toward the side of the third portion.

According to the optical receptacle, the claddings can be formed of the same material, therefore the claddings physical property can be equal. Therefore, the melting point is equal, and formation of the cladding outer diameter at fusing can be made easily.

A fourth aspect of the invention is an optical receptacle according to one of the first to third aspects of the invention, wherein the core diameter of the second portion increases linearly from the side of the first portion toward the side of the third portion.

According to the optical receptacle, even if the laser light incident to the second portion spreads radially, the laser light results in being incident to a boundary between the core and the cladding with a small angle, and the light can be prevented from going away to the cladding side due to the total reflection of the light.

A fifth aspect of the invention is an optical receptacle according to one of the first to third aspects of the invention, wherein the core diameter of the second portion increases nonlinearly from the side of the first portion toward the side of the third portion.

According to the optical receptacle, since a precise control of fused fiber tensile strength, fusing discharge time and power in forming the second portion is not needed, therefore the manufacturing can be made with relative ease.

A sixth aspect of the invention is an optical receptacle according to one of the first to third aspects of the invention, wherein the core of the second portion includes a step on a part of a region having the core diameter of the second portion increasing from the side of the first portion toward the side of the third portion.

According to the optical receptacle, since a precise control of fused fiber tensile strength, fusing discharge time and power in forming the second portion is not needed, therefore the manufacturing can be made with relatively ease. Since fibers with different melting points can be connected by adopting this shape, the fiber used in fusing can be selected broadly.

A seventh aspect of the invention is an optical receptacle according to one of the first to sixth aspects of the invention, wherein the core diameter of the first portion is not less than 0.5 μm and not more than 8 μm.

According to the optical receptacle, light zooming is not needed in the light incidence to the fiber by making MFD small on the fiber side with respect to the light emitted from a fine optical waveguide. This makes a coupling distance short and can contribute to simplification of the lens.

An eighth aspect of the invention is an optical receptacle according to one of the first to seventh aspects of the invention, wherein a difference between a refractive index of the core and a refractive index of the cladding of the first portion is larger than a difference between a refractive index of the core and a refractive index of the cladding of the third portion.

According to the optical receptacle, when the light with a smaller beam waist diameter than the third portion is transmitted in the first portion, the light can be propagated with a single mode and a little loss.

A ninth aspect of the invention is an optical receptacle according to one of the first to eighth aspects of the invention, wherein a difference between a refractive index of the core and a refractive index of the cladding of the first portion is larger than a difference between a refractive index of the core and a refractive index of the cladding of the second portion.

According to the optical receptacle, when the light with smaller beam waist diameter than the second portion is transmitted in the first portion, the light can be propagated with a single mode and a less loss.

A tenth aspect of the invention is an optical receptacle according to one of the first to ninth aspects of the invention, wherein the core diameter of the third portion is not less than 8 μm and not more than 20 μm.

According to the optical receptacle, since MFD can be uniform with the optical communication single mode fiber used generally at the present, the coupling loss due to MFD difference in the case of coupling with the plug ferrule.

An eleventh aspect of the invention is an optical receptacle according to one of the first to tenth aspects of the invention, wherein a difference between a refractive index of the core and a refractive index of the cladding of the third portion is smaller than a difference between a refractive index of the core and a refractive index of the cladding of the second portion.

According to the optical receptacle, when the light with a smaller beam waist diameter than the second portion is transmitted in the third portion, the light can be propagated with a single mode and a little loss.

A twelfth aspect of the invention is an optical receptacle according to one of the first to eleventh aspects of the invention, and a difference between a refractive index of the core and a refractive index of the cladding of the second portion decreases from the side of the first portion toward the side of the third portion.

According to the optical receptacle, the refractive indexes of the first portion and the third portion can be prevented from abruptly changing by gradually decreasing refractive index from the side of the first portion toward the side of the third portion, and the optical loss due to the reflection and the scattering at the coupling position of the first portion and the third portion can be suppressed.

A thirteenth aspect of the invention is an optical receptacle according to one of the first to twelfth aspect of the invention, wherein an outer diameter of the optical fiber of the first portion is equal to an outer diameter of the optical fiber of the third portion.

According to the optical receptacle, since the outer shapes of the first portion and the third portion are equal, the center axis shift of the first portion and the third portion can be prevented, and the fusion loss due to the axis shift can be suppressed.

A fourteenth aspect of the invention is an optical receptacle according to one of the first to thirteenth aspects of the invention, wherein an outer diameter of the optical fiber of the second portion is smaller than an outer diameter of the optical fiber of the first portion.

According to the optical receptacle, since the elastic member exists in a wedge shape on the circumference of the second portion with a small outer diameter of the optical fiber, the optical fiber can be suppressed from protruding outside the ferrule, and the break and crack on the circumference of the optical fiber can be suppressed.

A fifteenth aspect of the invention is an optical receptacle according to one of the first to fourteenth aspects of the invention, wherein an outer diameter of the optical fiber of the second portion is smaller than an outer diameter of the optical fiber of the third portion.

According to the optical receptacle, a wedge action due to the elastic member provided outside the cladding of the second portion can be more effective by making the cladding outer diameters of the second portion and the third portion different.

A sixteenth aspect of the invention is an optical receptacle according to one of the first to fifteenth aspects of the invention, wherein entire regions of the first portion, the second portion and the third portion are disposed in the through-hole.

According to the optical receptacle, since the entire optical fiber exists in the through-hole of the ferrule, defects such as a break and a crack of the optical fiber due to an external force can be suppressed.

A seventeenth aspect of the invention is an optical receptacle according to one of the first to sixteenth aspects of the invention, wherein the first portion includes a portion protruding from the ferrule, and entire regions of second portion and the third portion are disposed in the through-hole.

According to the optical receptacle, core adjustment when optically connecting the optical element to the optical receptacle becomes easy by causing the optical fiber to protrude the ferrule end surface.

An eighteenth aspect of the invention is an optical receptacle according to one of the first to seventeenth aspects of the invention, wherein on an end surface on an opposite side to a side of the fiber stub optically connection to the plug ferrule, a part of an end surface of the ferrule and an end surface of the optical fiber have a prescribed angle from a plane perpendicular to a center axis of the fiber stub.

According to the optical receptacle, by polishing a part of the end surface of the ferrule and the end surface of the optical fiber so as to have a prescribed angle from a plane perpendicular to the center axis of the fiber stub, the reflected light at the end surface of the optical fiber out of the light emitted from the light emitting element connected to the optical receptacle and incident to the optical fiber can be prevented from going back to the light emitting element, and the optical element can be stably operated.

A nineteenth aspect of the invention is an optical receptacle according to one of the first to eighteenth aspects of the invention, wherein the first portion, the second portion, and the third portion are integrated.

According to the optical receptacle, a gap can be prevented from occurring at respective boundaries of the first portion, the second portion, and the third portion by forming the optical fiber integrally, and thus the optical loss can be suppressed.

A twentieth aspect of the invention is an optical receptacle according to one of the first to nineteenth aspects of the invention, wherein a length of the first portion along a center axis of the fiber stub is not less than 5 µm.

According to the optical receptacle, the optical loss due to fluctuation of the length of the optical fiber and polishing can be suppressed.

A twenty first aspect of the invention is an optical receptacle according to one of the first to twentieth aspects of the invention, wherein a length of the third portion along a center axis of the fiber stub is not less than 5 µm.

According to the optical receptacle, the optical loss due to fluctuation of the length of the optical fiber and polishing can be suppressed.

A twenty second aspect of the invention is an optical transceiver comprising the optical receptacle according to one of the first to twenty first aspects of the invention.

According to the optical transceiver, while contributing to making a total length of the optical module short by making a core of an optical element side end surface of the optical fiber small and fusing a fiber having a larger refractive index difference between the core and the cladding than the fiber generally used for the transmission line, a conversion coefficient of a mode field can be suppressed by forming a portion with gradually drifting refractive index and core diameter on the fused portion of the optical fiber used generally for the transmission line and the optical fiber having the large refractive index difference between the core and the cladding, and as a result, reduction of a coupling coefficient from an optical element to a plug ferrule can be suppressed.

Embodiments of the invention will be illustrated hereinafter with reference to the accompanying drawings. The same reference numbers are applied to the same elements in the figures, and detailed description will be omitted as appropriate.

First Embodiment

FIG. 1 is a schematic cross-sectional view of an optical receptacle showing a first embodiment of the invention.

The optical receptacle 1 is made of a fiber stub 4, a holder 5 holding the fiber stub 4, and a sleeve 6, where the fiber stub 4 includes an optical fiber 2, a ferrule 3 having a through-hole 3c holding the optical fiber 2, and an elastic member 9, one end of the sleeve 6 is capable of holding a tip of the fiber stub 4, one other end of the sleeve 6 is capable of holding the plug ferrule inserted into the optical receptacle 1, and the optical fiber 2 is fixedly adhered using the elastic member 9 in the through-hole 3c of the ferrule 3. The plug ferrule that is inserted into the optical receptacle 1 is not shown.

Although materials suited to the ferrule 3 include a ceramic, glass, etc., a zirconia ceramic is used in the example; the optical fiber 2 is fixedly adhered in the center of the ferrule 3; and one end (an end surface 3b: referring to FIG. 1) to be optically connected to the plug is formed by polishing into a convex spherical surface. Also, in many cases, the fiber stub 4 is pressed into the holder 5 and fixed by the holder 5 in the assembly of the optical receptacle 1.

Although materials suited to the sleeve 6 include a resin, a metal, a ceramic, etc., a split sleeve made of a zirconia ceramic having a slit in the total length direction was used in the example. At the one end, the sleeve 6 can hold the tip portion (the end surface 3b) of the fiber stub 4 polished into the convex spherical surface; and at the one other end, the sleeve 6 can hold the plug ferrule inserted into the optical receptacle.

The optical fiber 2 has a core 8 extending along a center axis C1 and a cladding 7 surrounding the core 8. For example, a refractive index of the core is higher than a refractive index of the cladding. A material of the optical fiber (core 8 and cladding 7) includes, for example, a quartz glass. An impurity may be added to the quartz glass.

The fiber stub 4 has one end surface (end surface 3b) optically connected to the plug ferrule and one other end surface (end surface 3a) on an opposite side of the one end surface. The core 8 is exposed from the cladding 7 on the end surface 3a and the end surface 3b.

For example, an optical element such as a semiconductor laser element or the like is disposed on the end surface 3a side. A light emitted from the semiconductor laser element or the like is incident on the optical receptacle 1 from the end surface 3a side, and propagates in the core 8. A light incident on the core 8 from the end surface 3b propagates in the core 8, and is emitted from the end surface 3a side toward the optical element.

An optical element such as an isolator or the like may be provided between the end surface 3a and the optical element or the like of the semiconductor laser element or the like. The isolator has, for example, an element (Faraday element or the like) rotating a polarization angle or a polarizer, and causes the light to transmit only in one direction. Thereby, for example, a damage of the laser element due to a return light reflected at the end surface 3a and noise or the like can be suppressed.

The fiber stub 4 may be polished so that the end surface 3a is slanted to a plane orthogonal to the center axis C1. That is, the end surface 3b having a convex spherical surface may have the slanted convex spherical surface being slanted to the plane orthogonal to the center axis C1. Thereby, the optical receptacle 1 is optically connected to APC (Angled Physical Contact) on the end surface 3b, and is able to suppress reflection and connection loss at a connection point.

Figure 2:
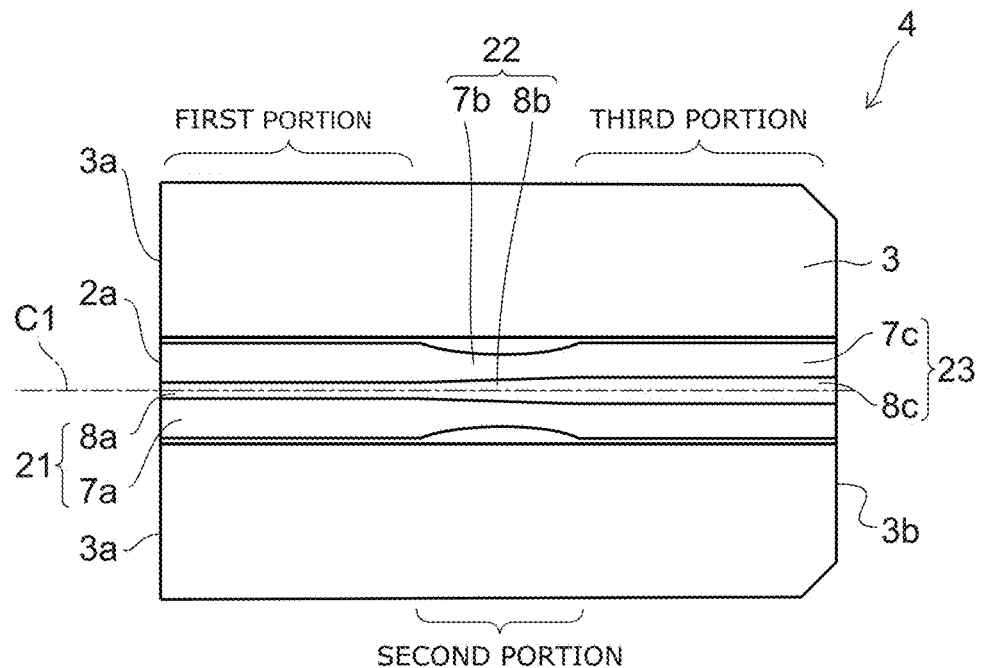
FIG. 2 is an enlarged cross-sectional view of a fiber stub of the first embodiment of the invention.

FIG. 2 is an enlarged cross-sectional view of a fiber stub of the first embodiment of the invention.

The optical fiber 2 is one fiber which a first portion (first portion 21), a second portion (second portion 22) and a third portion (third portion 23) are fused. The first portion of the optical fiber 2 is formed of a first portion cladding 7a and a first portion core 8a, the second portion is formed of a second portion cladding 7b and a second portion core 8b, and the third portion is formed of a third portion cladding 7c and a third portion core 8c. Third portion is disposed on the polished end surface 3b side of the convex spherical surface of the fiber stub 4, the second portion is disposed on the center, and the first portion is disposed on the end surface 3a side opposite to the end surface 3b and optically connected to the optical element. The first portion cladding 7a, the second portion cladding 7b and the third portion cladding 7c are included in the cladding 7 described with reference to FIG. 1. The first portion core 8a, the second portion core 8b and the third portion core 8c are included in the core 8 described with reference to FIG. 1.

A core diameter D1 of the first portion is smaller than a core diameter D3 of the third portion, and a core diameter D2 of the second portion increases gradually (for example, see FIG. 3) with transition from the first portion to the third portion. While a fiber outer diameter D4 of the first portion and a fiber outer diameter D6 of the third portion have the same size, a fiber outer diameter D5 of the second portion is smaller than the size (for example, see FIG. 3). The core diameter is a length of the core along the direction orthogonal to the optical axis (center axis C1), namely, a diameter of the core. The fiber outer diameter is a length (length of cladding) of the fiber along the direction orthogonal to the center axis C1.

A method for forming the second portion includes a method of stretching the optical fiber fused portion while applying heat higher than a melting point of quartz from a circumference of the fused portion in fusing the first portion with the third portion. The length of the fiber stub 4 of the second portion in the center axis C1 direction is necessary to be designed with consideration of a length with the minimum loss and a limited length which can be stretched while heating. The length is desired to be from not less than 10 micrometers (μm) to 1000 μm.

The shape of the second portion will be shown in FIG. 3, FIG. 4, FIG. 5, FIG. 6 and FIG. 7.

Figure 3:
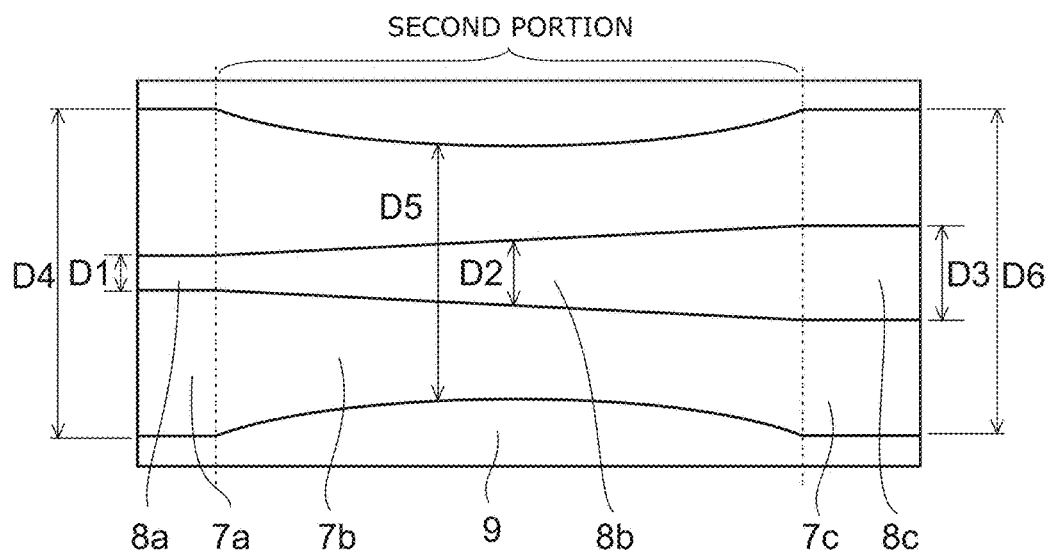
FIG. 3 is an enlarged cross-sectional view in a state in which a second portion of the first embodiment of the invention is enlarged linearly.
Figure 4:
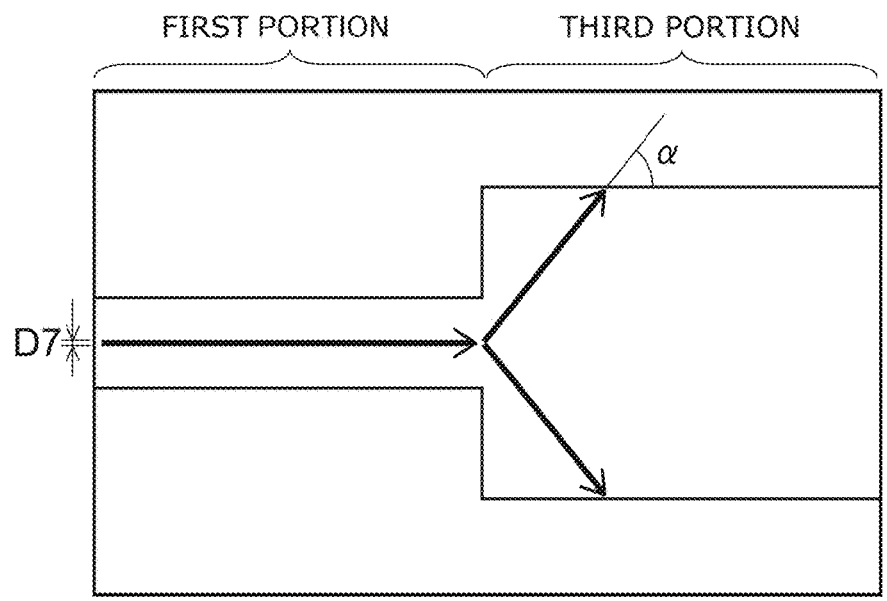
FIG. 4 is a schematic view of beam propagation of the first embodiment of the invention.
Figure 4:
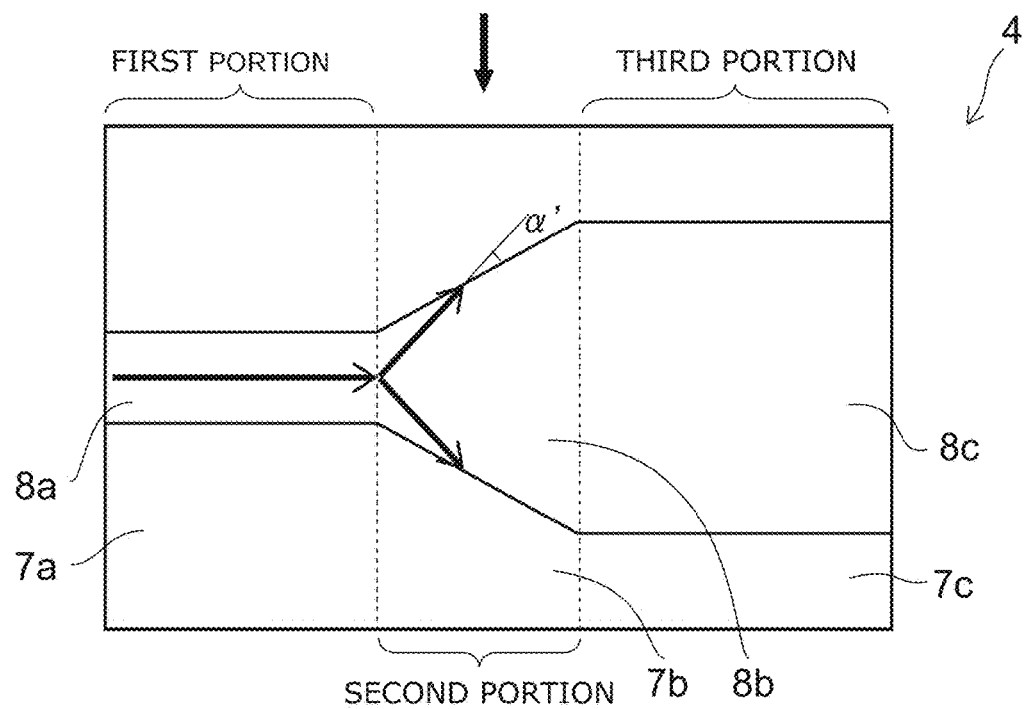

FIG. 3 shows a state in which the core diameter D2 of the second portion linearly expands as the transition from the first portion to the third portion. By adopting this shape, even if the laser entering the second portion spreads at the spreading angle α, as shown in FIG. 4, it is incident at a small angle α' with respect to the wall, and escape of the light to the cladding side is suppressed. However, for forming this shape, it is necessary to control strictly a velocity of pulling the fiber, a discharge amount and discharge timing for adding heat to the fiber, and a discharge position, and a difficulty level of shape formation is relatively high.

Figure 5:
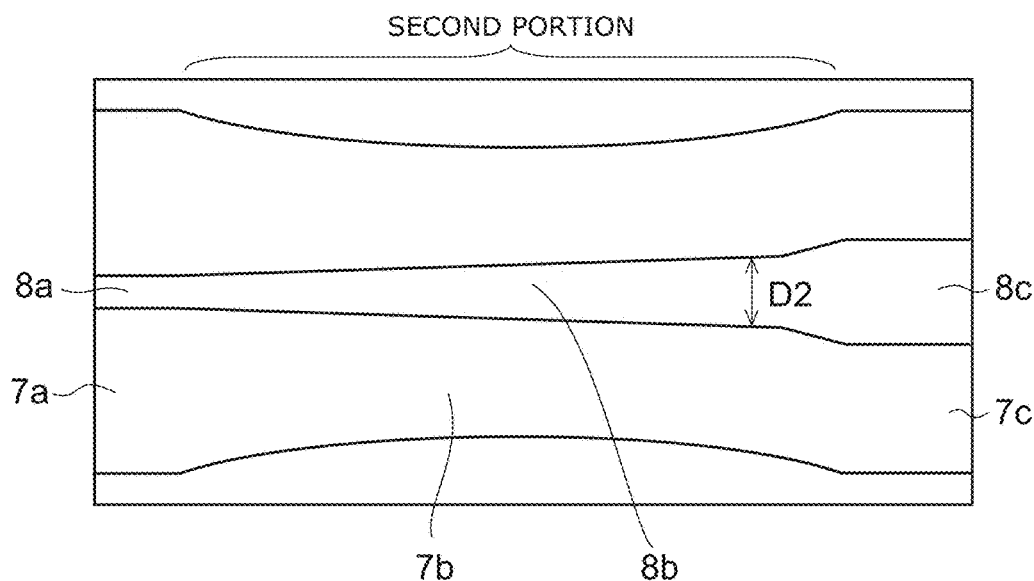
FIG. 5 is an enlarged cross-sectional view in a state in which a second portion of the first embodiment of the invention is enlarged nonlinearly.

FIG. 5 shows a state in which the core diameter D2 of the second portion nonlinearly expands as the transition from the first portion to the third portion. By adopting this shape, the loss in the conversion portion (second portion) becomes possibly larger than linear expansion of the core, however since the allowable value with respect to the above control terms expands, there is an advantage that the shape can be formed by relatively simple control also in a manufacturing equipment which the discharge amount and the discharge timing are not possible to be controlled.

Figure 6:
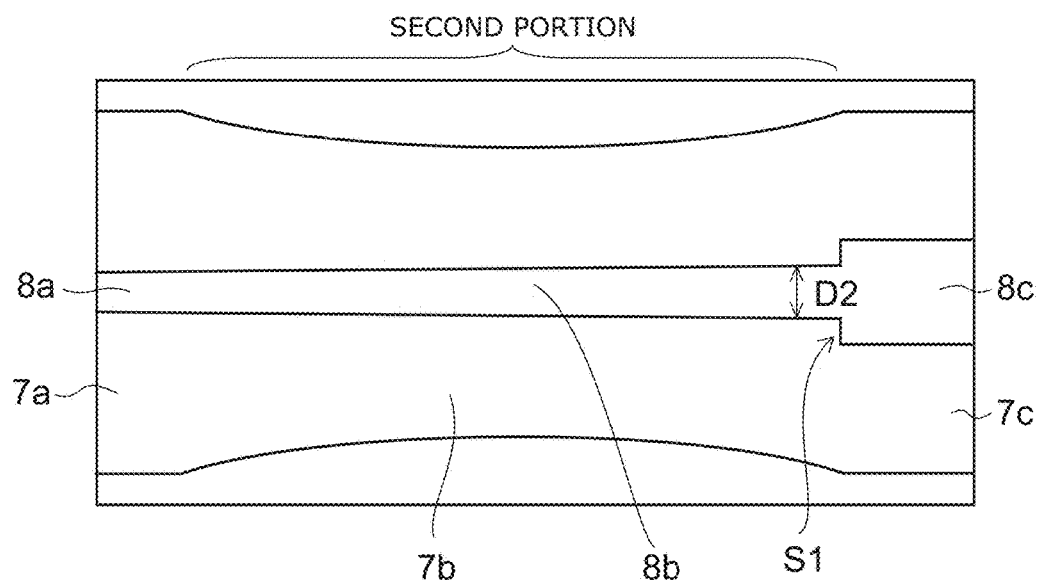
FIG. 6 is an enlarged cross-sectional view in a state in which the second portion of the first embodiment of the invention has a step.

FIG. 6 shows a state in which the core diameter D2 of the second portion nonlinearly expands as the transition from the first portion to the third portion, however a part of the boundary of the cladding 7 and the core 8 has a portion S1 (in the specification, this is referred to as a step) generally perpendicular to the fiber center axis C1. By adopting this shape, there may be an advantage that the shape can be formed even if in the case where it is difficult to transfer heat over the entire second portion during fusing.

A size of the difference between a refractive index of each portion and a refractive index of the core is largest in the first portion, is large next in the second portion, and is smallest in the third portion. Because the second portion is formed in the fusion of the first portion and the third portion, a refractive index difference is large on the first portion side and the refractive index difference becomes gradually small as the approach to the third portion side.

In the case where the laser is collimated to the state of beam waist diameter D7, the laser has the characteristics of spreading with the spreading angle α. That is, if one of the spreading angle or the beam diameter is determined, the other is determined inevitably.

As a method producing the refractive index difference between the core and the cladding, a method is known adding a rare earth element such as erbium or germanium to a quartz glass, and the object to be added includes the core and the cladding or both of them. The refractive index can be adjusted by the additive in the quartz glass and the concentration. In each of the first portion, the second portion, and the third portion, the refractive index of the core and the refractive index of the fiber are appropriately not less than 1.4 and not more than 1.6, respectively. Since the NA (aperture) which the light can be incident is determined by the refractive index difference between the core and the fiber, the fiber used for the first portion is necessary to be a fiber caused to have the refractive index difference so that the spreading angle of the laser which is incident on the first portion coincides with NA.

Since of the spreading angle is determined, the incident diameter is determined as well, the fiber having MFD (mold field diameter) fitting with the diameter of the incident beam is necessary to be used accompanied with the refractive index difference.

The lengths of the first portion and the third portion in the center axis C1 are desired to be not less than 100 μm in order to ensure a distance which the incident light settles down in a single mode. It is desired that the second portion is adjusted to be located at the vicinity of the center of the through-hole 3c of the ferrule 3.

In the fiber stub 4, the optical fiber 2 is fixed to the through-hole 3c of the ferrule 3 by using an elastic member (adhesive agent) 9. Here, a material adequate for the adhesive agent includes resin-based adhesive agent such as epoxy and silicone or the like, however in the working example, a high temperature curable type epoxy-based adhesive agent is used. In the through-hole 3c of the ferrule 3, the adhesive agent is provided between the optical fiber 2 and an inner wall of the ferrule 3. For example, the adhesive agent is filled in a space existing between the optical fiber 2 and the inner wall of the ferrule 3. Even in a case where the adhesive agent is filled in the space, bubble with a maximum length of not more than 30 μm may exist in a region between the optical fiber 2 and the ferrule 3 where the diameter of the through-hole 3c is substantially constant. In this example, in the through-hole 3c of the ferrule 3, the adhesive agent is filled without gaps in the space existing between the optical fiber 2 and an inner wall of the ferrule 3.

Here, in examples shown in FIG. 1 to FIG. 6, since the fiber outer diameter D5 of the second portion is smaller than the fiber outer diameter D4 of the first portion, and smaller than the fiber outer diameter D6 of the third portion, a gap is generated between the ferrule 3 and the fiber circumference of the second portion in the through-hole 3c. The elastic member 9 is filled without gaps as the adhesive agent. Thereby, the elastic member 9 filled outside the fiber of the second portion serves as a wedge to the fiber, the fiber stub 4 and a plug ferrule inserted into the optical receptacle 1 contact due to optical connection, and the transition of the fiber stub 4 or the optical fiber 2 is suppressed from transitioning in an axial direction, even if an external force is applied in parallel to the axial direction.

Since the second portion is formed by fusing the first portion and the third portion, strength of the second portion may be lower than strength of the first portion or strength of the third portion depending on a formation condition. In contrast, the second portion can be reinforced by filling the elastic member 9 into the circumference of the second portion.

Figure 7:
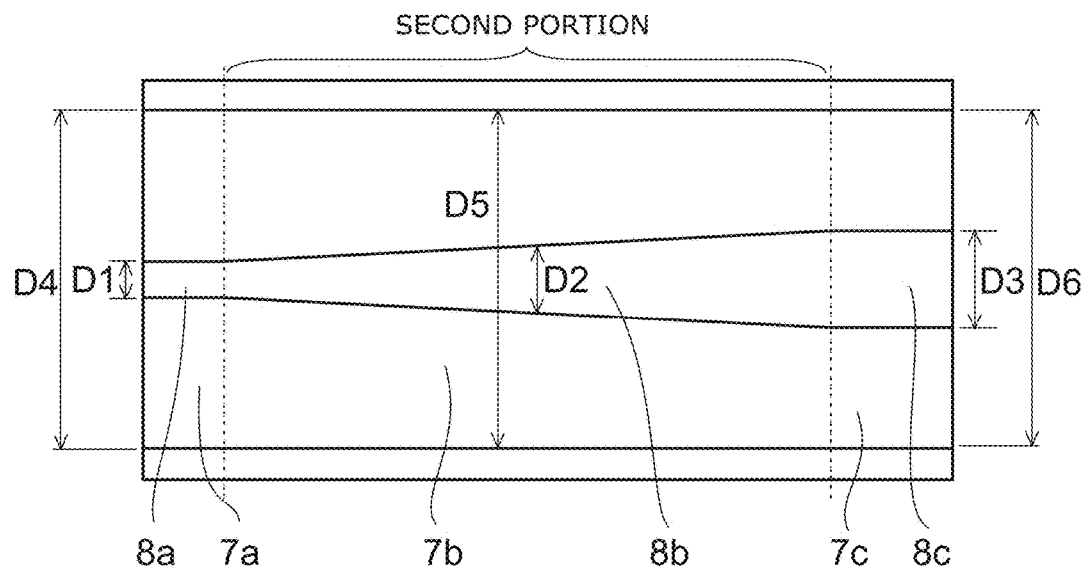
FIG. 7 is a schematic cross-sectional view illustrating the second portion of the first embodiment of the invention.

However, in the embodiment, as shown in FIG. 7, the fiber outer diameter D5 of the second portion may be substantially the same as the fiber outer diameter D4 of the first portion or the fiber outer diameter D5 of the third portion. By adopting this shape, when the optical fiber 2 is formed by fusion, it can be relatively simply made to control the discharge amount and the discharge timing.

Generally, in order to enter the light to the optical fiber 2 in the optical receptacle 1, or prevent the light reflection on an end surface 2a (see FIG. 2) of the optical fiber 2 in emitting the light from the optical fiber 2, the end surface 2a of the optical fiber 2 is polished so as to be a plane generally substantially perpendicular to the center axis C1 (same as the center axis of the fiber stub) of the ferrule 3 on an end surface 3a on an opposite side to an end surface 3b polished to be a convex spherical surface of the fiber stub 4. Here, generally perpendicular is desired to be approximately 85 degrees to 95 degrees with respect to the center axis C1.

In the first embodiment of the invention, the end surface 2a of the optical fiber 2 is polished to be a plane perpendicular to the center axis C1 of the fiber stub 4, furthermore the end surface 2a of the optical fiber 2 and the end surface 3a of the ferrule 3 exist on the generally same plane. Here, the generally same plane is desired to have a distance between the end surface 2a of the optical fiber 2 and the end surface 3a of the ferrule 3 being approximately −250 nm to +250 nm.

The center of the core 8 of the optical fiber 2 exists within a range of 0.005 millimeters (mm) from the center of the ferrule 3 on the end surface 3a on the opposite side to the end surface 3b polished to be a convex spherical surface of the fiber stub 4. Thereby, by controlling a position of the core 8 of the optical fiber 2, a connection loss in the assembly of the optical module can be reduced and the optical module can be assembled easily.

The convex spherical surface of the fiber stub 4 is usually formed on the plane perpendicular to the center axis C1 of the ferrule 3, however may be formed on a plane having a prescribed angle (for example, 4 degrees to 10 degrees) from the perpendicular plane.

Second Embodiment

Figure 8:
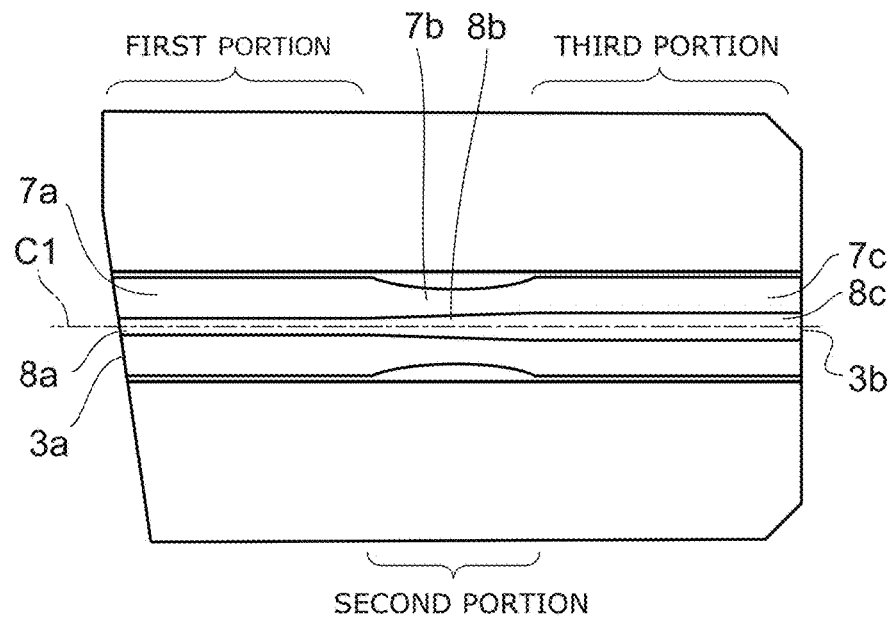
FIG. 8 is an enlarged cross-sectional view of a fiber stub of a second embodiment of the invention.

FIG. 8 is an enlarged cross-sectional view of an optical receptacle of a second embodiment of the invention.

The member forming the optical receptacle 1 is similar to the first embodiment, and on the end surface 3a (see FIG. 8) on an opposite side to the end surface 3b (see FIG. 8) polished in a convex spherical surface of the ferrule 3 having the optical fiber 2 and the through-hole 3c holding the optical fiber 2, a part of the end surface 2a of the optical fiber 2 and the end surface 3b of the ferrule 3 is polished to be a plane having a prescribed angle (for example, 4 degrees to 10 degrees) from the plane perpendicular to the center axis C1 of the ferrule 3.

This prevents the reflected light on the end surface 2a of the optical fiber 2 from returning to the light emitting element, the reflected light being emitted from the light emitting element connected to the optical receptacle 1 and incident to the optical fiber 2, and is possible to operate the optical element stably.

Usually, in order to form a plane having a prescribed angle from the plane perpendicular to the center axis C1 of the ferrule 3 of the fiber stub 4, it is formed by simultaneously polishing the ferrule 3 and the optical fiber 2 after inserting the optical fiber 2 into the through-hole 3c of the ferrule 3 and fixing by the adhesive agent.

In the first and second embodiments of the invention, the circumference of the end portion 2b where the outer diameter of the second portion is small is filled with the elastic member (adhesive agent) 9 for fixing the optical fiber 2 in the through-hole 3c of the ferrule 3. Therefore, even if a force parallel to the center axis C1 of the optical fiber is operated, the elastic member operates as a wedge, and a shift in the center axis direction of the fiber can be suppressed, and thus losses accompanied with contact failure and a phenomena of protrusion of the fiber from the ferrule are not likely to occur.

Next, the investigation about the core diameter and the refractive index of the first portion and the length of the second portion in the center axis C1 direction which the inventors worked will be described with reference to the drawings.

Figure 9:
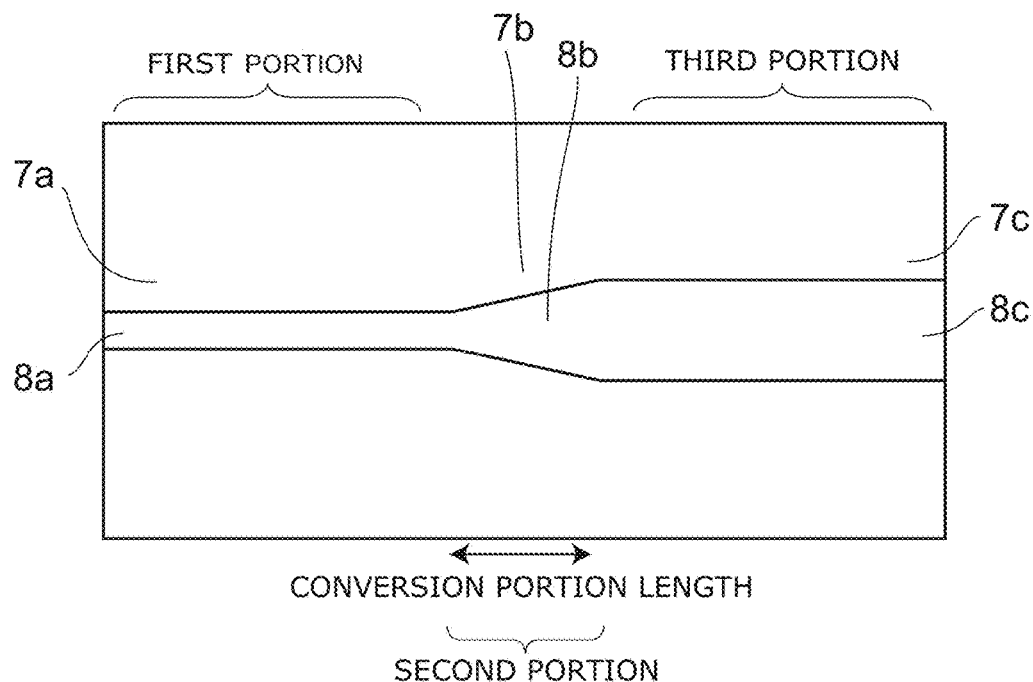
FIG. 9 is a schematic view illustrating one example of analysis about a conversion portion length of the second portion.
Figure 10:
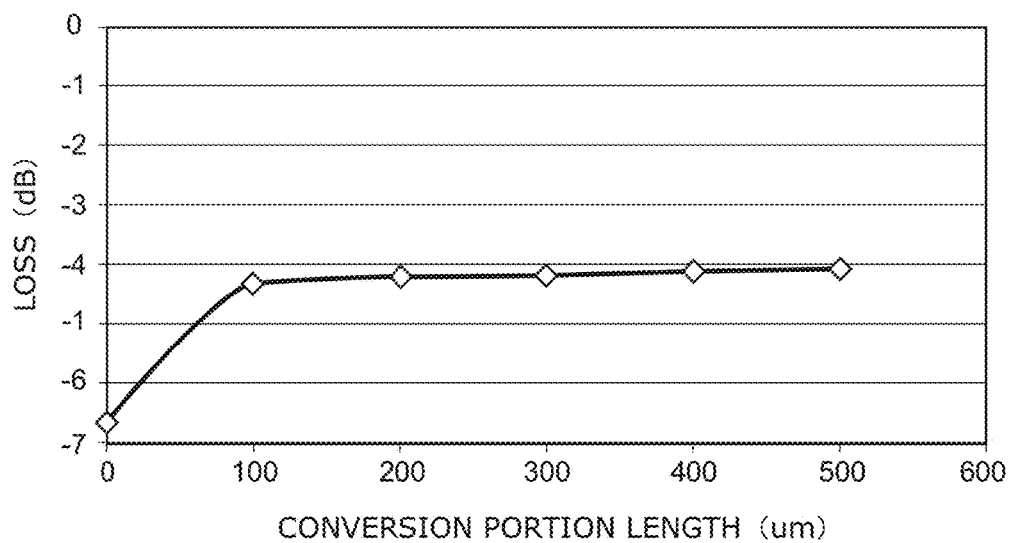
FIG. 10 is a graph chart showing an analysis result about the conversion portion length of the second portion.
Figure 11:
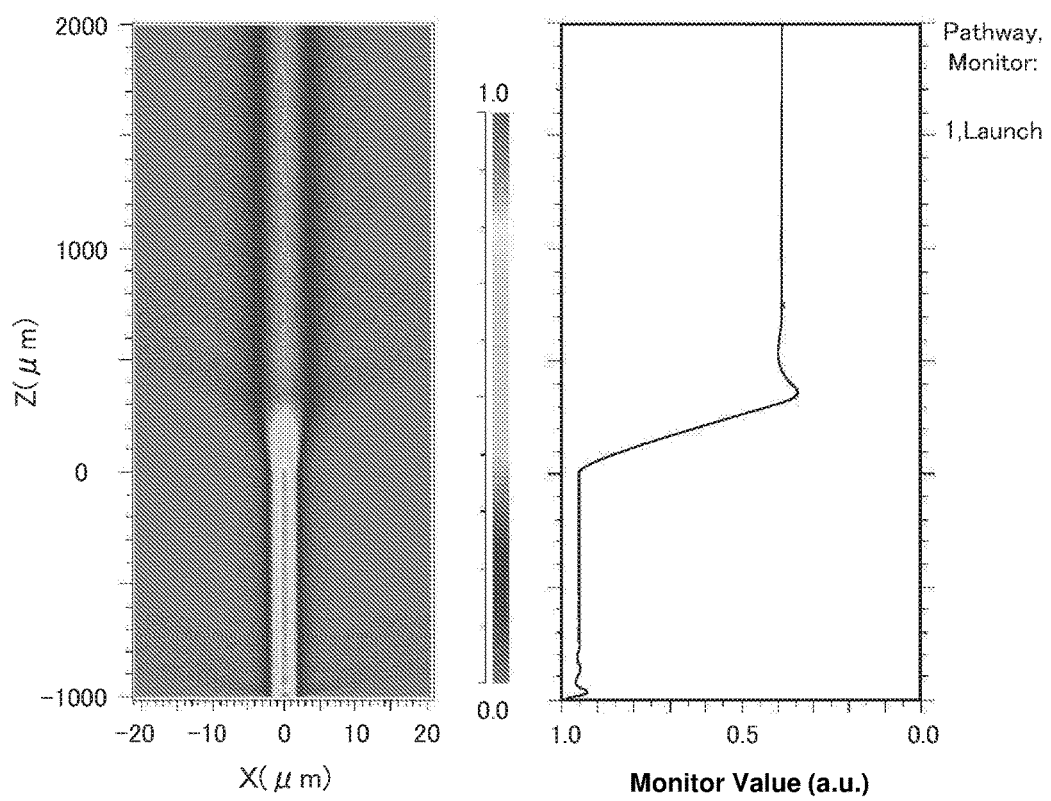
FIG. 11 is a contour chart and a graph chart showing a light intensity distribution of the analysis result about the conversion portion length of the second portion.

FIG. 9 to FIG. 11 are schematic views illustrating one example of analysis conditions and analysis results used for the investigation.

FIG. 9 is a schematic cross-sectional view showing the optical fiber used for the investigation.

In the case where a beam having a beam waist of a diameter w1 is incident on a fiber having MFD of a diameter w2, it is known that a coupling coefficient n is obtained from the following formula, if it is assumed that there is no axis shift in a direction perpendicular to the optical axis, an angle shift, and a shift of the optical axis direction.

$$\eta = \frac{4}{\left(\frac{w1}{w2} + \frac{w2}{w1}\right)^2} \quad \text{Formula 1}$$

According to this theoretical formula, it is found that the coefficient is 1 (100%) when w1=w2 where the beam waist of the laser coincides with MFD of the fiber. It is known that although MFD of a single mode fiber varies depending on a wavelength in a range of the core diameter of 0 to 10 μm, the diameter is larger than the core diameter of the fiber by 0.5 to 4 μm. From this fact, the core diameter of the fiber is desired to be smaller than the incident beam waist by approximately 0.5 to 4 μm.

The refractive index difference will be described. In order for the light to propagate through the single mode fiber, it is desired that the spreading angle θ1 of the light coincides with the acceptance angle θ2 of the fiber. This θ1 is known to be obtained by the following formula.

$$\theta 1 = \tan^{-1}\left(\frac{\lambda}{\pi w1}\right) = \frac{\lambda}{\pi w1} \quad \text{Formula 2}$$

According to this formula, if the beam waist w1 of the incident laser beam is found, the spreading angle θ1 can be obtained. It is known that the acceptance angle θ2 of the fiber is obtained from a refractive index $n_{core}$ of the core and a refractive index $n_{clad}$ of the cladding as shown in the formula 3.

$$\theta 2 = \sin^{-1}\sqrt{n_{cave}^2 - n_{clad}^2}$$ Formula 3

Since if the incident beam waist w1 is determined, the beam spreading angle is inevitably determined, the refractive index difference between the core of the fiber and the cladding should be determined so as for θ2=θ1 to be satisfied. For example, when a quartz glass is used for the core and the cladding, the refractive indexes of the core and the cladding drift in a range of 1.4 to 1.6 approximately.

The length of the second portion in the center axis C1 direction will be described. In order to confirm the effect due to this length difference, optical CAE analysis is performed. In the investigation, it is assumed that the core diameter D1 of the first portion is 3 μm, the refractive index of the first portion core 8a is 1.49, the core diameter D3 of the third portion is 8.2 μm, the refractive index of the third portion core 8c is 1.4677, the total length of the fiber is 1000 μm, the refractive index of the cladding (7a, 7b, 7c) of each portion is common to be 1.4624, and the beam waist diameter D7 of the incident beam is 3.2 μm. Under this condition, the length of the second portion in the center axis C1 direction is changed from 0 μm to 500 μm in 100 μm increments, in such a case how the light intensity changes is calculated. The length of the first portion and the third portion is assumed to be (1000 μm−second portion length)÷2, respectively A graph chart summing up the analysis results of this analysis is shown in FIG. 10. The horizontal axis represents the length of the second portion in the center axis C1 direction, and the vertical axis represents the light intensity at a fiber emitting end in a logarithmic scale. According to this analysis results, if the length of the second portion in the center axis C1 becomes longer, the loss in the optical fiber 2 is decreased. The state of change is that the loss decreases drastically due to the increase of the length up to 0 to 100 μm, and the loss becomes nearly flat at 100 μm or more. From this, it is considered that the length of the second portion is desired to be not less than 100 μm.

FIG. 11 is a graph showing the light intensity distribution in the fiber using a contour chart and a graph chart. The vertical axis of the graph shows the distance of the fiber from the incident end, and the horizontal axis shows the light intensity. The notable point in this graph is that the light does not almost attenuate in the propagation process in the first portion and the third portion. Although the incident light reduces the intensity initially due to interference of the light, it becomes stable at the position of a certain amount of propagation from the emitting end. After that, it enters the second portion while keeping a constant value. The light intensity reduces in the second portion due to occurrence of the loss by the conversion of MFD and the refractive index change, and after that enters the third portion. In the third portion, the intensity does not almost change and keeps a constant value up to the emitting end.

According to one embodiment of the invention, since the length of the first portion and the third portion in the center axis C1 direction does not influence the attenuation, the fiber function and the total loss of the fiber are not influenced even if the length changes. In other words, the length of the first portion and the third portion can be designed to be an arbitrary length by the designer, furthermore the dimensional tolerance of the design dimension can be large. The advantage is that strict dimension accuracy such as the GI fiber and the fiber with a lens is not necessary and can contribute to improvement of the mass productivity largely.

Next, the investigation about the length of the first portion along the center axis C1 and the length of the third portion along the length along the center axis C1 will be described.

FIG. 12A to FIG. 12C are schematic views illustrating an optical receptacle of a reference example used for the investigation of the length of the first portion and one example of the analysis results.

The optical receptacle of the reference example includes a fiber stub 49 shown in FIG. 12A. The structure of the fiber stub 49 of the reference example is similar to the structure in which the first portion 21 (first portion cladding 7a and first portion core 8a) is not provided in the fiber stub 4 according to the embodiment.

That is, the fiber stub 49 includes an optical fiber 29, and a ferrule holding the optical fiber 29. The fiber stub 49 has an end surface 39b connected to the plug ferrule and an end surface 39a on an opposite side to the end surface 39b. The optical fiber 29 includes a second portion 229 (conversion portion) and a third portion 239. The third portion 239 is arranged with the second portion 229 in an axis direction and continuous with the second portion 229. The second portion 229 forms a part of the end surface 39a, and the third portion 239 forms a part of the end surface 39b. A core diameter of the second portion 229 expands toward the third portion 239 in the center axis C1 direction. A core diameter of the third portion 239 is substantially constant in in the center axis C1 direction. In FIG. 12A, a partial element such as the elastic member or the like is omitted for convenience.

Generally, the end surface 39a is polished to mirror finish. The end surface 39b is polished to have a convex spherical surface. Thereby, the optical loss in the end surfaces 39a, 39b can be suppressed. In the optical receptacle, it is desired that the end surface is polished from the point of view of connection of the optical element and the optical receptacle (for example, a V-shaped groove is used) and removal of adhered adhesive agent.

The amount of polishing of the end surface 39a is for example, not less than 5 μm and not more than 50 μm. Thereby, the mirror-like end surface can be formed.

Here, in the fiber stub 49 shown in FIG. 12A, for example, if the end surface 39a is polished by approximately 5 to 50 μm, a length of the second portion 229 becomes short depending on the amount of polishing. In other words, an end surface position (a position of an exposed portion as a part of the end surface 39a of the second portion 229) of the second portion 229 varies approximately by 5 to 50 μm. That is, a core diameter Da of the end surface 39a varies. This is a cause of loss in the case of using a fiber that periodically changes the MFD, such as a GI fiber.

The inventors of the application have made the analysis about the relationship between the polish of the end surface 39a and the loss such as described above. One example of the analysis results is shown in FIG. 12B and FIG. 12C. In this investigation, before polishing the end surface 39a, it is assumed that the length La of the second portion 229 along the axis direction is 50 μm, the core diameter Da of the end surface 39a is 3 μm, and the core diameter Db of the end surface 39b is 9 μm. A change rate the core diameter of the second portion 229 along the axis direction is assumed to be constant.

FIG. 12B shows the loss (dB) in the case where in the fiber stub 49 as described above, due to the polishing the end surface 39a, the length La is shortened by 20% (amount of polishing 10 μm), 40°/b (amount of polishing 20 μm), 60% (amount of polishing 30 μm) or 80°/h (amount of polishing 40 μm) due to the polishing the end surface 39a. FIG. 12C is a graph chart showing datum of FIG. 12B. Here, the loss (dB) is calculated from the light intensity at the emitting end (end surface 39*b*) in the case where the light (diameter DL=3 µm) is incident from the end surface 39*a*.

The loss is −1.06 dB before polishing the end surface 39*a*. It is found from the graph that when the second portion 229 is shortened due to polishing, the loss increases. For example, when the conversion portion (second portion 229) is shortened by 50% due to polishing, the loss is approximately −3 dB.

In this manner, in the reference example of not providing the first portion, the loss results in increase by polishing the end surface. Even if the core diameter of the end surface before polishing is decided preliminarily in consideration of the amount of polishing in the reference example, the loss fluctuates depending on fluctuation of the amount of polishing. It is necessary to control strictly the amount of polishing, and the mass productivity may be reduced.

Contrarily, in the optical receptacle according to the embodiment, the first portion which the core diameter and the refractive index do not substantially change along the center axis C1 is provided. Even if the length of the first portion along the center axis C1 varies by polishing the end surface 3*a*, the increase of the optical loss and the change of the fluctuation are small. For example, even if the end portion position changes within a range of the first portion, the characteristics of the optical receptacle does not substantially deteriorate.

From the above, the length of the first portion along the center axis C1 is desired to be not less than the amount of polishing of the end surface 3*a*. As described above, in order for the end surface 3*a* to be mirror-like, the end surface 3*a* is polished by approximately not less than 5 µm and not more than 50 µm. Therefore, the length of the first portion along the center axis C1 is desired to be not less than 5 µm, and if possible, further desired to be not less than 50 µm. The upper limit of the length of the first portion along the center axis C1 is not particularly limited as long as the second portion and the third portion can be provided in the fiber stub 4 (in the through-hole of the ferrule 3). Therefore, the first portion may be expanded up to approximately 7 to 10 mm depending on the total length of the fiber stub 4. Thereby, the mass productivity can be improved.

The descriptions about FIG. 12A to FIG. 12C are similar, for example, in the reference example without the third portion as well. That is, in this case, the core diameter of the end surface connected to the plug ferrule changes depending on the amount of polishing. The loss increases depending on the change of the core diameter of the end surface. Contrarily, in the optical receptacle according to the embodiment, the third portion is provided, in which the core diameter and the refractive index do not substantially change along the center axis C1. Even if the length of the third portion along the center axis C1 varies by polishing the end surface 3*b*, increase of the optical loss and change of the fluctuation are small.

From the above, the length of the third portion along the center axis C1 is desired to be not less than the amount of polishing of the end surface 3*b*. For example, in order to make the end surface 3*b* into a convex spherical surface, the end surface 3*b* is polished up to approximately not less than 5 µm and not more than 20 µm. Therefore, the length of the third portion along the center axis C1 is desired to be not less than 5 µm, and if possible, further desired to be not less than 20 µm. The upper limit of the length of the third portion along the center axis C1 is not particularly limited as long as the first portion and the second portion can be provided in the fiber stub 4 (in the through-hole of the ferrule 3). Therefore, the third portion may be expanded up to approximately 7 to 10 mm depending on the total length of the fiber stub 4. Thereby, the mass productivity can be improved.

As described above, according to the embodiment, since the core diameter D1 of the fiber stub 4 on the end surface 3*a* on an opposite side to the end surface 3*b* polished to have a convex spherical surface is smaller than the core diameter D2 of the end surface 3*b* polished to have a convex spherical surface, the length of the optical module can be small. Dimension control with a high accuracy can be unnecessary to the lengths in the axis direction of the first portion and the third portion.

Since the fiber outer diameter D5 of the second portion is smaller than the through-hole 3*c* of the cladding, by filling the gap with the elastic member 9, the fiber can be suppressed from moving in the center axis direction.

Third Embodiment

Figure 13:
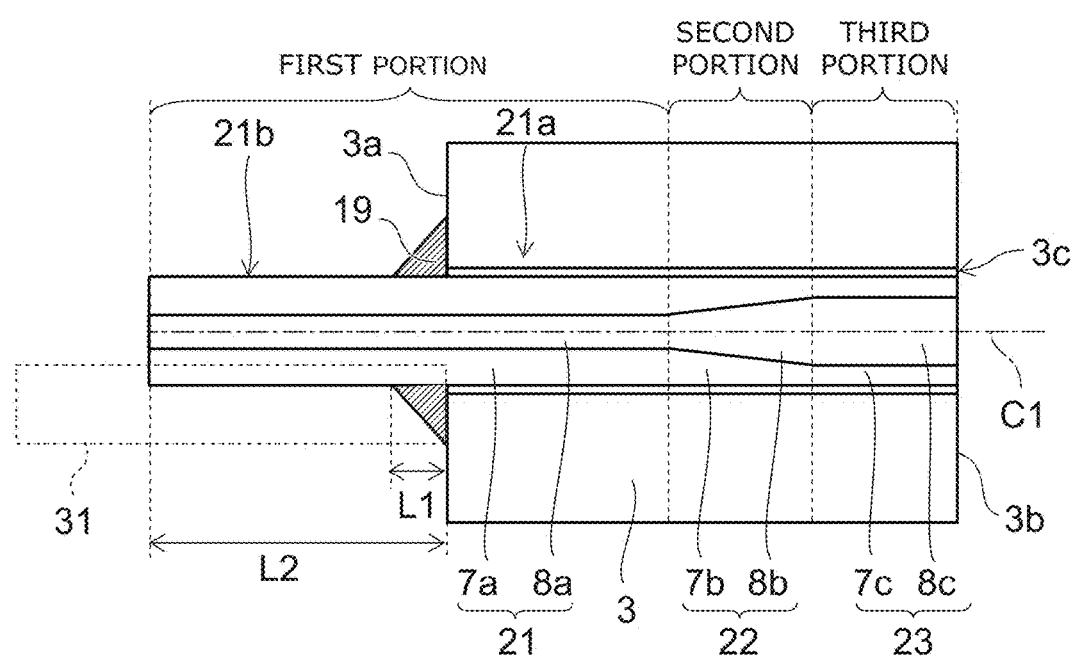
FIG. 13 is a schematic cross-sectional view illustrating a fiber stub of a third embodiment of the invention.

FIG. 13 is a schematic cross-sectional view illustrating one example of a part of an optical receptacle according to a third embodiment of the invention.

FIG. 13 shows an enlarged portion of the fiber stub 4 of the optical receptacle according to the embodiment. As shown in FIG. 13, the first portion (first portion 21) includes a portion (inside portion 21*a*) disposed in the through-hole 3*c* of the ferrule 3 and a portion (protruding portion 21*b*) disposed outside the through-hole 3*c*. The optical receptacle according to the embodiment includes an elastic member 19. The embodiment other than the above is similar to the first or the second embodiment.

The protruding portion 21*b* protrudes outward from (the surface of the ferrule 3 on an opposite side to the end surface 3*b*) the ferrule 3. That is, the protruding portion 21*b* is not arranged with the ferrule 3 in a direction perpendicular to the center axis C1. The inside portion 21*a* is arranged with the ferrule 3 in the direction perpendicular to the center axis C1, and is surrounded by the ferrule 3 as viewed along the center axis C1.

The entire regions of the second portion and the entire region of the third portion are disposed in the through-hole 3*c*, respectively. That is, the entire region of the second portion and the entire region of the third portion are arranged with the ferrule 3 in the direction perpendicular to the center axis C1, and are surrounded by the ferrule 3 as viewed along the center axis C1.

As described previously, the module and the optical element such as semiconductor laser element or the like are provided on an opposite side to the end surface 3*b* of the optical receptacle. FIG. 13 shows a portion 31 of the optical element as one example.

For example, the portion 31 of the optical element has a shape (groove or the like) corresponding to the protruding portion 21*b*. When assembling the optical element and the optical receptacle, the protruding portion 21*b* is mounted on the portion 31 of the optical element and is directly pressed against a light emitting end of the optical element. Alternatively, the light is set to enter the protruding portion 21*b* from the light emitting end by using an element such as a lens or the like. Thereby, a labor of core adjustment at the assembly can be reduced. The accuracy of the core adjustment can be improved and the optical connection loss can be reduced.

The elastic member 19 is provided on an end portion of the protruding portion 21*b* on the third portion side. The elastic member 19, for example, contacts the protruding portion 21*b* and the ferrule 3. Thereby, the elastic member 19 protects the first portion. A length L1 of the elastic member 19 along the center axis C1 is, for example, approximately 2 mm. Therefore, a length L2 of the protruding portion 21b along the center axis C1 is desired to be not less than 2 mm. From the view point of securing the strength of the first portion and downsizing the optical receptacle, the length L2 of the protruding portion 2b is desired to be not more than 20 mm. Since the second portion and the third portion are disposed in the through-hole 3c, and thus are protected by the ferrule 3.

Fourth Embodiment

Figure 14A:
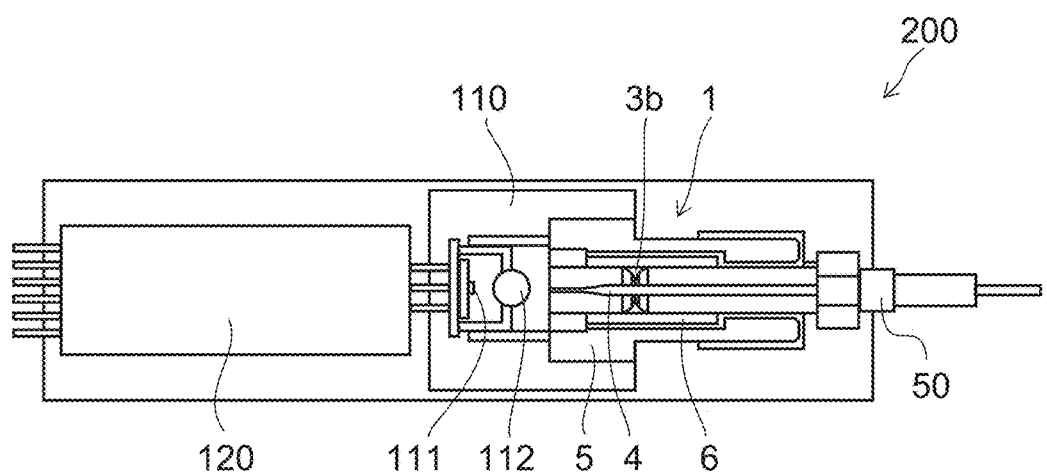
FIG. 14A and FIG. 14B are schematic views illustrating an optical transceiver of a fourth embodiment of the invention.
Figure 14B:
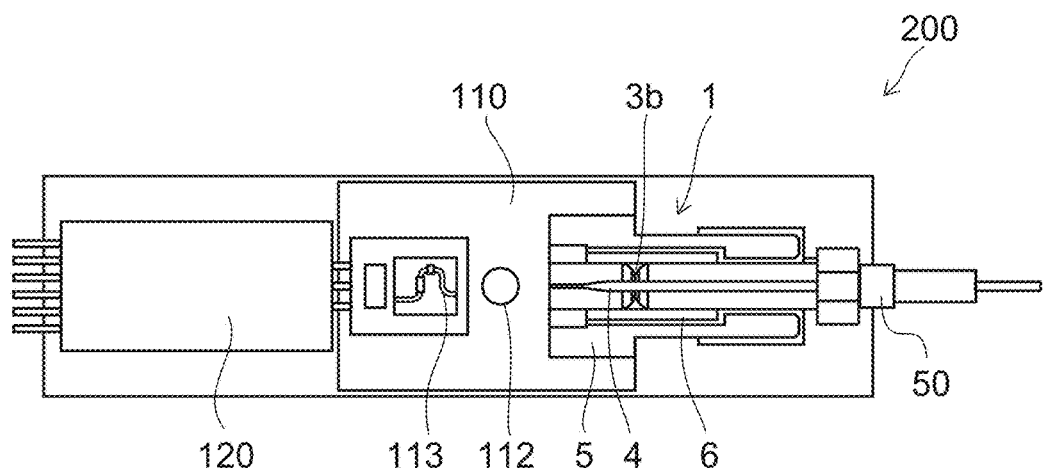

FIG. 14A and FIG. 14B are schematic views illustrating an optical transceiver of a fourth embodiment of the invention.

As shown in FIG. 14A, a transceiver 200 according to the embodiment includes an optical receptacle 1, an optical element 110, and a control substrate 120.

Circuits or the like are formed on the control substrate 120. The control substrate 120 is electrically connected to the optical element 110. The control substrate 120 controls the operation of the optical element 110.

The optical element 110 may include, for example, the optical element or the light emitting element. In this example, the optical element 110 is a light emitting portion. The optical element 110 includes a laser diode 111 and a lens 112. The laser diode 111 is controlled by the control substrate 120 and emits the light to the fiber stub 4 of the optical receptacle 1. The lens 112 is located between the optical receptacle 1 and the laser diode 111 on an optical path of the emitted light.

The optical element 110, as shown in FIG. 14B, may include an element 113. The element 113 includes the laser diode and an optical waveguide with a small core diameter. The light propagating in the core of the waveguide is incident on the optical receptacle 1 through the lens 112. The optical waveguide is formed by, for example, silicon photonics. A quartz waveguide may be used for the optical waveguide. In the embodiment, the light emitted from the laser diode or the optical waveguide may be directly incident on the optical receptacle 1 without providing the lens 112.

A plug ferrule 50 is inserted in the optical receptacle 1. The plug ferrule 50 is held by a sleeve 6. The optical fiber 3 is optically connected to the plug ferrule 50 on the end surface 3b. Thereby, the optical element 110 and the plug ferrule 50 are optically connected through the optical receptacle, and thus optical communication is possible.

According to one embodiment of the invention, an optical receptacle is provided in which, by making the core small at the optical element side end surface of the optical fiber while contributing to shortening the optical module total length, the dimensional tolerance with a high accuracy is not necessary with respect to the axis direction length of the fiber, the decrease of the coupling efficiency can be prevented by suppressing the movement in the axis direction of the optical fiber, and thus the loss of MFD conversion can be suppressed.

The embodiments of the invention have been described above. However, the invention is not limited to the above description. Those skilled in the art can appropriately modify the above embodiments, and such modifications are also encompassed within the scope of the invention as long as they include the features of the invention. For instance, the shape, dimension, material, arrangement and the like of various components in the fiber stub 4 and the like, and the installation configuration and the like of the ferrule 3 and the optical fiber 2 are not limited to those illustrated, but can be modified appropriately.

Furthermore, various components in the above embodiments can be combined with each other as long as technically feasible. Such combinations are also encompassed within the scope of the invention as long as they include the features of the invention.

What is claimed is:

1. An optical receptacle, comprising:
a fiber stub including an optical fiber, a ferrule, and an elastic member, the optical fiber including a cladding and a core for conducting light, the ferrule having a through-hole fixing the optical fiber, the elastic member fixing the optical fiber in the through-hole; and
a holder holding the fiber stub,
the fiber stub having one end surface on a side of the ferrule configured to be optically connected to a plug ferrule, and one other end surface on an opposite side to the one end surface,
the optical fiber including a first portion having a length of at least 5 μm along a center axis of the fiber stub on an side of the one other end surface, a third portion having a length of at least 5 μm along a center axis of the fiber stub on a side of the one end surface, and a second portion between the first portion and the third portion,
a core diameter of the first portion being smaller than a diameter of the third portion,
a core diameter of the second portion increasing from a side of the first portion toward a side of the third portion,
the elastic member being provided between the optical fiber and an inner wall of the through-hole, and
an outer diameter of the second portion of the optical fiber is smaller than at least one of an outer diameter of the first portion of the optical fiber and an outer diameter of the third portion of the optical fiber.

2. The receptacle according to claim 1, wherein
a refractive index of the core of the first portion, a refractive index of the core of the second portion, and a refractive index of the core of the third portion are equal one another,
a refractive index of the cladding of the first portion is smaller than a refractive index of the cladding of the third portion, and
a refractive index of the cladding of the second portion increases from the side of the first portion toward the side of the third portion.

3. The receptacle according to claim 1, wherein
a refractive index of the cladding of the first portion, a refractive index of the cladding of the second portion, and a refractive index of the cladding of the third portion are equal one another,
a refractive index of the core of the first portion is larger than a refractive index of the core of the third portion, and
a refractive index of the core of the second portion decreases from the side of the first portion toward the side of the third portion.

4. The receptacle according to claim 1, wherein
the core diameter of the second portion increases linearly from the side of the first portion toward the side of the third portion.

5. The receptacle according to claim 1, wherein
the core diameter of the second portion increases nonlinearly from the side of the first portion toward the side of the third portion.

6. The receptacle according to claim 1, wherein
the core of the second portion includes a step on a part of a region having the core diameter of the second portion increasing from the side of the first portion toward the side of the third portion.

7. The receptacle according to claim 1, wherein
the core diameter of the first portion is not less than 0.5 µm and not more than 8 µm.

8. The receptacle according to claim 1, wherein
a difference between a refractive index of the core and a refractive index of the cladding of the first portion is larger than a difference between a refractive index of the core and a refractive index of the cladding of the third portion.

9. The receptacle according to claim 1, wherein
a difference between a refractive index of the core and a refractive index of the cladding of the first portion is larger than a difference between a refractive index of the core and a refractive index of the cladding of the second portion.

10. The receptacle according to claim 1, wherein
the core diameter of the third portion is not less than 8 µm and not more than 20 µm.

11. The receptacle according to claim 1, wherein
a difference between a refractive index of the core and a refractive index of the cladding of the third portion is smaller than a difference between a refractive index of the core and a refractive index of the cladding of the second portion.

12. The receptacle according to claim 1, wherein
a difference between a refractive index of the core and a refractive index of the cladding of the second portion decreases from the side of the first portion toward the side of the third portion.

13. The receptacle according to claim 1, wherein
the outer diameter of the first portion of the optical fiber is equal to the outer diameter of the third portion of the optical fiber, and
the outer diameter of the second portion of the optical fiber is smaller than both the outer diameter of the first portion of the optical fiber and the outer diameter of the third portion of the optical fiber.

14. The receptacle according to claim 1, wherein
entire regions of the first portion, the second portion and the third portion are disposed in the through-hole.

15. The receptacle according to claim 1, wherein
the first portion includes a portion protruding from the ferrule, and
entire regions of second portion and the third portion are disposed in the through-hole.

16. The receptacle according to claim 1, wherein
on the end surface on the opposite side to the one end surface of the fiber stub configured to be optically connected to the plug ferrule, a part of an end surface of the ferrule and an end surface of the optical fiber have a prescribed angle from a plane perpendicular to a center axis of the fiber stub.

17. The receptacle according to claim 1, wherein
the first portion, the second portion, and the third portion are fused together.

18. The receptacle according to claim 1, wherein
a length of the first portion along a center axis of the fiber stub is not less than 100 µm.

19. The receptacle according to claim 1, wherein
a length of the third portion along a center axis of the fiber stub is not less than 100 µm.

20. An optical transceiver comprising: the optical receptacle according to claim 1, an optical element which emits light, and a controller.

21. An optical receptacle, comprising:
a fiber stub including an optical fiber, a ferrule, and an elastic member, the optical fiber including a cladding and a core for conducting light, the ferrule having a through-hole fixing the optical fiber, the elastic member fixing the optical fiber in the through-hole; and
a holder holding the fiber stub,
the fiber stub having one end surface on a side of the ferrule configured to be optically connected to a plug ferrule, and one other end surface on an opposite side to the one end surface,
the optical fiber including a first portion having a length of at least 5 µm along a center axis of the fiber stub on an side of the one other end surface, a third portion having a length of at least 5 µm along a center axis of the fiber stub on a side of the one end surface, and a second portion between the first portion and the third portion,
a core diameter of the first portion being smaller than a diameter of the third portion,
a core diameter of the second portion increasing from a side of the first portion toward a side of the third portion,
the elastic member being provided between the optical fiber and an inner wall of the through-hole, and
a difference between a refractive index of the core and a refractive index of the cladding of the first portion is larger than a difference between a refractive index of the core and a refractive index of the cladding of the third portion.

22. An optical receptacle, comprising:
a fiber stub including an optical fiber, a ferrule, and an elastic member, the optical fiber including a cladding and a core for conducting light, the ferrule having a through-hole fixing the optical fiber, the elastic member fixing the optical fiber in the through-hole; and
a holder holding the fiber stub,
the fiber stub having one end surface on a side of the ferrule configured to be optically connected to a plug ferrule, and one other end surface on an opposite side to the one end surface,
the optical fiber including a first portion having a length of at least 5 µm along a center axis of the fiber stub on an side of the one other end surface, a third portion having a length of at least 5 µm along a center axis of the fiber stub on a side of the one end surface, and a second portion between the first portion and the third portion,
a core diameter of the first portion being smaller than a diameter of the third portion,
a core diameter of the second portion increasing from a side of the first portion toward a side of the third portion,
the elastic member being provided between the optical fiber and an inner wall of the through-hole, and
a difference between a refractive index of the core and a refractive index of the cladding of the first portion is larger than a difference between a refractive index of the core and a refractive index of the cladding of the second portion.

23. An optical receptacle, comprising:
a fiber stub including an optical fiber, a ferrule, and an elastic member, the optical fiber including a cladding and a core for conducting light, the ferrule having a through-hole fixing the optical fiber, the elastic member fixing the optical fiber in the through-hole; and
a holder holding the fiber stub,
the fiber stub having one end surface on a side of the ferrule configured to be optically connected to a plug ferrule, and one other end surface on an opposite side to the one end surface,
the optical fiber including a first portion having a length of at least 5 μm along a center axis of the fiber stub on an side of the one other end surface, a third portion having a length of at least 5 μm along a center axis of the fiber stub on a side of the one end surface, and a second portion between the first portion and the third portion,
a core diameter of the first portion being smaller than a diameter of the third portion,
a core diameter of the second portion increasing from a side of the first portion toward a side of the third portion,
the elastic member being provided between the optical fiber and an inner wall of the through-hole, and
a difference between a refractive index of the core and a refractive index of the cladding of the third portion is smaller than a difference between a refractive index of the core and a refractive index of the cladding of the second portion.

24. An optical receptacle, comprising:
a fiber stub including an optical fiber, a ferrule, and an elastic member, the optical fiber including a cladding and a core for conducting light, the ferrule having a through-hole fixing the optical fiber, the elastic member fixing the optical fiber in the through-hole; and
a holder holding the fiber stub,
the fiber stub having one end surface on a side of the ferrule configured to be optically connected to a plug ferrule, and one other end surface on an opposite side to the one end surface,
the optical fiber including a first portion having a length of at least 5 μm along a center axis of the fiber stub on an side of the one other end surface, a third portion having a length of at least 5 μm along a center axis of the fiber stub on a side of the one end surface, and a second portion between the first portion and the third portion,
a core diameter of the first portion being smaller than a diameter of the third portion,
a core diameter of the second portion increasing from a side of the first portion toward a side of the third portion,
the elastic member being provided between the optical fiber and an inner wall of the through-hole, and
a difference between a refractive index of the core and a refractive index of the cladding of the second portion decreases from the side of the first portion toward the side of the third portion.

25. An optical receptacle, comprising:
a fiber stub including an optical fiber, a ferrule, and an elastic member, the optical fiber including a cladding and a core for conducting light, the ferrule having a through-hole fixing the optical fiber, the elastic member fixing the optical fiber in the through-hole; and
a holder holding the fiber stub,
the fiber stub having one end surface on a side of the ferrule configured to be optically connected to a plug ferrule, and one other end surface on an opposite side to the one end surface,
the optical fiber including a first portion having a length of at least 5 μm along a center axis of the fiber stub on an side of the one other end surface, a third portion having a length of at least 5 μm along a center axis of the fiber stub on a side of the one end surface, and a second portion between the first portion and the third portion,
a core diameter of the first portion being smaller than a diameter of the third portion,
a core diameter of the second portion increasing from a side of the first portion toward a side of the third portion,
the elastic member being provided between the optical fiber and an inner wall of the through-hole,
the first portion includes a portion protruding from the ferrule, and
entire regions of second portion and the third portion are disposed in the through-hole.

* * * * *